Fig. 2A

Dec. 10, 1957  S. A. SCHERBATSKOY  2,816,235
RADIOACTIVITY WELL LOGGING CALIBRATING SYSTEM
Filed Feb. 15, 1954  6 Sheets-Sheet 4

INVENTOR.
Serge A. Scherbatskoy
BY
Mason, Kolehmainen,
Rathburn & Wyss
Attorneys

2,816,235

RADIOACTIVITY WELL LOGGING CALIBRATING SYSTEM

Serge A. Scherbatskoy, Tulsa, Okla., assignor, by mesne assignments, to PGAC Development Co., Houston, Tex., a corporation of Texas Application February 15, 1954, Serial No. 410,285

25 Claims. (Cl. 250—83.6)

The present invention relates to a radioactivity well logging system, more particularly, to a radioactivity well logging system wherein a neutron log of the formation traversed by the borehole is obtained, and the invention has for an object the provision of new and improved methods and apparatus for standardizing and calibrating a group of well logging instruments of the above described type so that field measurements made with these instruments may be interpreted, compared and correlated.

In radioactivity well logging instruments of the type which are adapted to provide a so-called neutron log, an arrangement is conventionally employed wherein a source of neutrons, a shield and a neutron detector are positioned within a subsurface unit which is moved up and down within the borehole. The response of the neutron detector is usually amplified and is transmitted over the supporting cable to the earth's surface at which point a permanent record or log of the response of the neutron detector is made. In a given formation, the response of the well logging instrument depends primarily upon the following parameters:

(1) The intensity and the energy spectrum of the neutrons emitted by the neutron source within the subsurface instrument.

(2) The distance between the neutron source and the neutron detector and the nature of the shield positioned between these elements.

(3) The sensitivity of the neutron detector.

Since all three of the above described parameters are subject to variations within certain tolerances and since it is extremely difficult to provide neutron detectors which provide uniform responses, it is impractical to maintain the tolerances close enough so that all well logging instruments will have identical responses at all times.

In certain types of radioactivity well logging systems, arrangements are provided for obtaining two radioactivity logs simultaneously and during one pass of the subsurface instrument through the borehole. For example, in my copending application Serial No. 205,616, filed January 12, 1951, now Patent No. 2,740,053, there is disclosed a simultaneous radioactivity well logging system wherein a neutron log and a natural gamma ray log are simultaneously obtained while employing a single subsurface unit within the borehole. In simultaneous radioactivity well logging systems of the type shown in my copending application referred to above, it is customary to employ a neutron source which also emits a large number of gamma rays. When the subsurface instrument is positioned within the borehole the relatively large number of gamma rays emitted by the neutron source do not affect the operation of the instruments since these gamma rays are attenuated in the drilling mud which surrounds the subsurface instrument, and in the surrounding formations, so that the natural gamma ray portion of the simultaneous well logging instrument is not responsive to the gamma rays emitted by the neutron source. However, when the neutron section of a simultaneous well logging instrument is calibrated outside of the borehole, the gamma rays emitted by the neutron source cause an undesired response in the gamma ray portion of the instrument with the result that interaction between the gamma ray and neutron portions of the instrument is produced and the calibration of the neutron portion of the instrument is affected.

Accordingly, it is another object of the present invention to provide new and improved methods and apparatus for calibrating a group of neutron well logging units so that the same response is obtained for a given standard well condition.

It is another object of the present invention to provide new and improved methods and apparatus for calibrating a neutron well logging instrument in the presence of relatively strong background radiation.

It is a further object of the present invention to provide a new and improved methods and apparatus for calibrating a simultaneous well logging system of the type adapted to provide a neutron log and a gamma ray log wherein means are provided for preventing the gamma ray portion of the instrument from affecting the calibration of the neutron portion of the instrument.

It is a still further object of the present invention to provide a new and improved calibrating device which may be employed to calibrate a group of neutron well logging instruments to a standard well condition.

Another object of the present invention resides in the provision of new and improved methods and apparatus for calibrating the neutron portion of a simultaneous neutron and gamma ray well logging system wherein the gamma ray portion of the apparatus is prevented from interfering with neutron calibration while permitting the position of the subsurface unit within the borehole to be reversed so that either the neutron or the gamma ray portion of the subsurface unit may be positioned at the bottom of the borehole.

A further object of the present invention resides in the provision of a new and improved switching arrangement for a radioactivity well logging instrument whereby at least a portion of the apparatus may be deenergized when the instrument is horizontal irrespective of the angular position of the instrument.

The invention, both as to its organization and method of operation, together with further objects and advantages thereof, will best be understood by reference to the following specification taken in connection with the accompanying drawings, in which.

Figure 1:
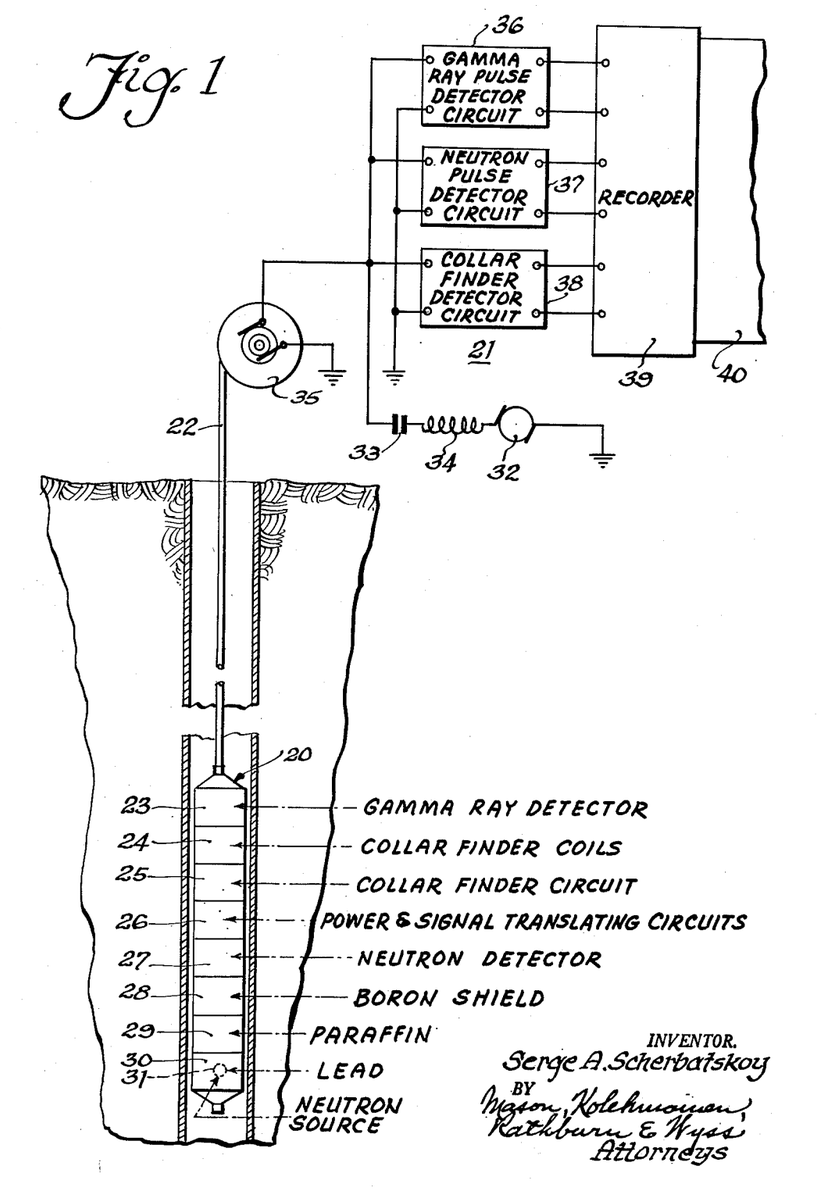
Fig. 1 diagrammatically illustrates a simultaneous neutron and gamma ray logging apparatus characterized by the features of the present invention.

Referring now to the drawings, and more particularly to Fig. 1 thereof, the neutron calibration methods and apparatus of the present invention are particularly designed for use in conjunction with and will be described in detail in connection with a simultaneous radioactivity well logging system of the type shown in Fig. 1 wherein a subsurface unit indicated generally at 20 and a surface unit indicated generally at 21 are interconnected by means of a single conductor coaxial cable 22. A simultaneous radioactivity well logging system of the type shown in Fig. 1, is shown and described in my copending application Serial No. 205,616, filed January 12, 1951. While reference may be had to the above identified copending application for a complete and detailed description of the radioactivity well logging system, per se, it is believed that a general description of this system will facilitate an understanding of the present invention. However, it will be understood that the present invention may be employed in conjunction with other types of neutron well logging instruments, the system shown in Fig. 1 being illustrated merely for purposes of description of the present invention.

In general, the subsurface unit 20 comprises a gamma ray detector 23, a pair of collar finder coils 24, a collar finder circuit 25, power and signal translating circuits 26, a neutron detector 27, a boron shield 28, a paraffin spacer 29 and a mass of lead 30 within which there is positioned a suitable neutron source 31. The component units 23 to 31, inclusive, are all housed within a sealed housing having the requisite physical strength to withstand the fluid pressures encountered and are preferably located in the housing in the particular order illustrated. In this connection it will be noted that the gamma ray detector 23 is positioned at the top of the instrument and the neutron detector 27 is positioned relatively close to the bottom of the instrument, it being understood that the boron shield 28, the paraffin spacer 29 and the lead mass 30 are actually of relatively small dimensions lengthwise of the unit. Preferably, the subsurface unit 20 is provided with suitable means for connecting the cable 22 to either end of the instrument so that either the gamma ray detector 23 or the neutron detector 27 may be positioned adjacent the bottom of the borehole. In this connection it will be further understood that in some instances it is desirable to obtain both a gamma ray log and a neutron log of formations at the bottom of the borehole and since the unit 20 is several feet in length, it is impossible to obtain both of these logs unless facilities are provided for reversing the instrument.

In the system shown in Fig. 1, an alternating current generator 32, forming a part of the surface equipment 21 is coupled to the cable 22 through the condenser 33 and is utilized to supply power over the cable 22 to the subsurface unit 20, a suitable choke coil 34 being connected in series with the condenser 33 to isolate the generator 32 from the cable 22, as will be readily understood by those skilled in the art. The cable 22 is carried on a suitable power operated drum 35 and conventional drive facilities are provided so that the cable may be fed into or reeled out of the borehole so as to move the subsurface equipment 20 longitudinally of the borehole. The surface equipment 21 further comprises a gamma ray pulse detector circuit 36, a neutron pulse detector circuit 37, a collar finder detector circuit 38 and a recorder 39 which operates to produce on the record strip 40 a continuous graph of both the neutron and gamma ray signals developed by the circuits 36 and 37 as well as indications on the strip 40 which identify the positions of casing collars in accordance with the output signals developed by the circuit 38.

The neutron source 31 is preferably a low cost source such as radium beryllium which is a powerful emitter of neutrons and also emits a large number of gamma rays. The neutrons which are emitted by the source 31 irradiate the surrounding formation with the result that neutrons are intercepted by the neutron detector 27 and cause a response therein. Preferably, the neutron detector 27 comprises a proportional counter which produces pulses the amplitudes of which are proportional to the energy of the motivating particles so that relatively large pulses are produced in response to neutrons and relatively small pulses are produced in response to gamma rays. The boron shield 28 and paraffin spacer 29 function to prevent the direct transmission of neutrons from the source 31 to the neutron detector 27.

The gamma ray detector 23 is positioned at one end of the unit 20 and is adapted to respond to gamma rays which are naturally emitted from the formation. The absorption of the lead shield 30 which surrounds the neutron source 31 and the mud which surrounds the subsurface unit 20 when this unit is within the borehole attenuates the gamma rays produced by the source 31 sufficiently so that the gamma ray detector 23 does not respond thereto. The detector 23 is also preferably of the pulse producing type and the pulses from the neutron detector 27 and the gamma ray detector 23 are impressed upon the cable 22 and are transmitted to the surface equipment 21. At the surface the gamma ray pulses are separated from the other signals present on the cable 22 and are supplied to the gamma ray pulse detector circuit 36. Also, the neutron pulses are separated from the other signals of the system and are supplied to the neutron pulse detector circuit 37. The collar finder circuit 25 in the subsurface unit 20 functions to develop unidirectional fluctuations of voltage which are transmitted over the cable 22 to the collar finder circuit 38 so that correlated logs of neutron and gamma ray activity within the borehole are provided in conjunction with collar location.

In the neutron portion of the system shown in Fig. 1 it will be evident that the response of a given well logging apparatus will depend upon certain parameters the most important of which are (1) the intensity and the energy spectrum of the neutrons emitted by the neutron source 31, (2) the distance between the source 31 and the neutron detector 27, (3) the characteristics of the boron shield 28 and the paraffin spacer 29, and (4) the sensitivity of the neutron detector 27. It will be evident that the foregoing parameters are all subject to certain variations from system to system so that certain tolerances are produced which render the systems non-uniform. Furthermore, since it is very difficult to construct neutron detectors which have highly uniform responses, it is impractical to attempt to maintain the tolerances close enough so that all instruments will have identical responses at all times. However, in accordance with the present invention, calibrating methods and apparatus are provided so that a number of well logging systems of the type shown in Fig. 1 may be calibrated to a standard instrument so that logs which are made with different instruments and in different locations may be compared and correlated directly.

Figures 7, 8, 9, 10, 11, 12:
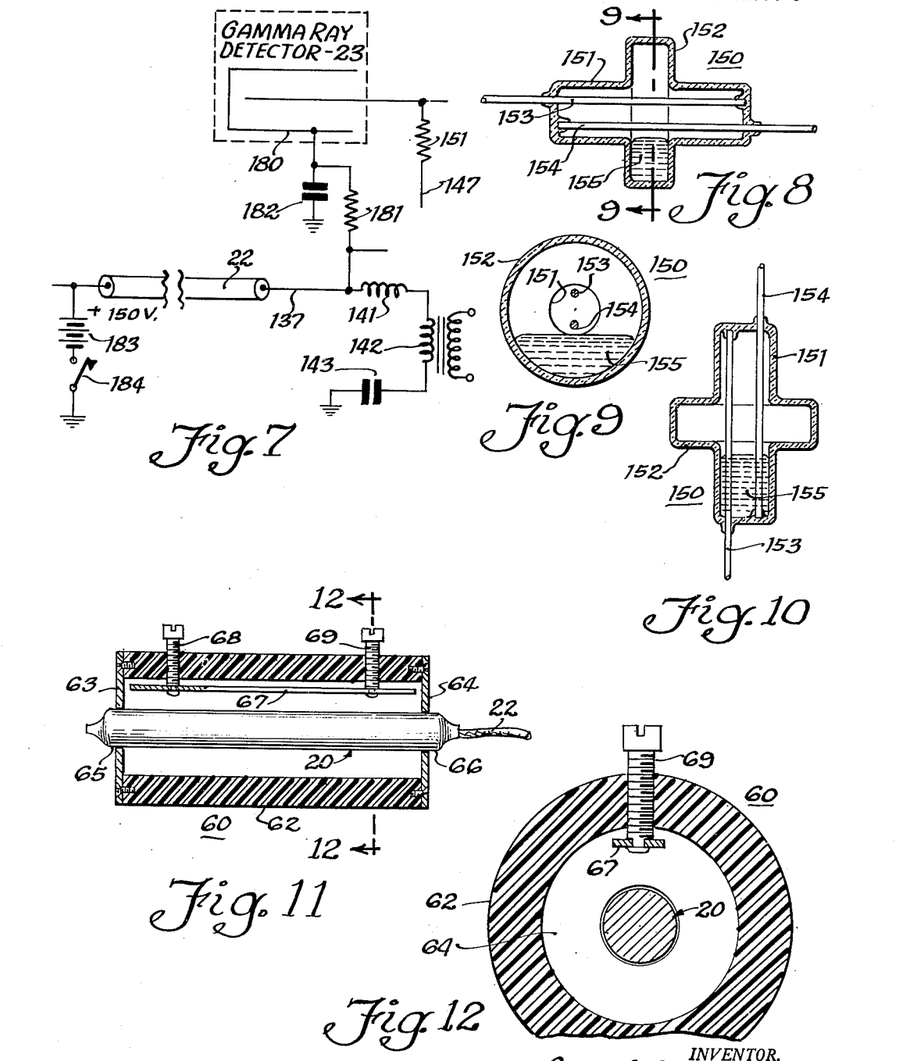
Fig. 7 is a somewhat diagrammatic illustration of a still further arrangement for deenergizing the gamma ray portion of the subsurface unit.
Fig. 8 is a sectional side elevational view of the mercury switch employed in the system of the present invention and shown in a position corresponding to a horizontal position of the subsurface unit.
Fig. 9 is a sectional view of the switch shown in Fig. 8 taken along the lines 9—9 thereof.
Fig. 10 is a sectional view of the switch shown in Fig. 8 with the switch in a position corresponding to a vertical position of the subsurface unit.
Fig. 11 is a sectional, side elevational view of the calibrating device employed to calibrate the neutron portion of the system of Fig. 1.
Fig. 12 is a sectional view on a somewhat larger scale of the calibrating device of Fig. 11 and taken along the lines 12—12 thereof.

In the calibration system of the present invention the response of a group of well logging instruments is first standardized and then rendered uniform by means of a number of field calibrator units, which have themselves been adjusted to provide uniform responses, so that a given response in counts per second from any one of a group of well logging instruments represent a standard set of conditions. More particularly, a calibrator device such as that indicated generally at 60 in Figs. 11 and 12 is employed, which may be slipped around a subsurface well logging unit, such as the unit 20 of the system shown in Fig. 1 while the unit 20 is at the earth's surface. Preferably, the unit 20 is calibrated while power is supplied thereto over the cable 22, the cable 22 being positioned on the reel of the truck, so that the calibrating operation is performed under actual operating conditions. The calibrator device 60 comprises a tubular body of neutron absorbing material 62 which is maintained concentric with the logging instrument 20 by means of stainless steel end pieces 63 and 64 which are secured to the ends of the tubular body 62, it being understood that the end pieces 63 and 64 are provided with suitable clearance holes 65 and 66 so that the unit 20 may be inserted into the calibrator device 60 in the manner shown in Fig. 11. The tubular body 62 preferably comprises a paper base phenolic resin and it has been found that a grade XXX laminated paper base phenolic resin manufactured by the Synthane Corporation is satisfactory. In the alternative the tubular body 62 may comprise a paraffin filled metallic cylinder. However, this latter arrangement has the disadvantage that it is difficult to keep the container completely full due to thermal expansion of the paraffin.

The calibrator device 60 is arranged to provide a certain amount of attenuation for the neutrons emitted by the neutron source 31 within the instrument 20 and the amount of attenuation provided by the device 60 is preferably a fixed multiple of a known and reproducible standard. For example, the calibrator device 60 may be arranged to provide an attenuation which is a fixed multiple of the attenuation produced when the instrument 20 is immersed in a body of distilled water. Such an arrangement is desirable since a primary standard consisting of a body of distilled water may be duplicated without difficulty in the event that it is desired to recalibrate the calibrator devices to the primary standard. Thus, for example, the calibrator device 60 may be adjusted to provide an attenuation which is 2.7 times the response of the unit 20 when positioned in distilled water. In this connection it will be understood that an infinite body of distilled water is not required, and it has been found that a body of water which is approximately 40 inches in diameter is sufficient to give substantially the same effect as an infinite body of pure water insofar as the response of the unit 20 is concerned.

In order to make all of the calibrator devices 60 uniform so that each device produces a response which is the same fixed multiple of the primary standard response when used with a particular well logging instrument, there is provided a strip of cadmium 67, which is mounted within the tubular body 62 by means of the adjustable screws 68 and 69 which are threaded through the side wall of the body 62 and may be adjusted so as to vary the distance of the strip 67 from the unit 20. Accordingly, with a given logging instrument 20, all of the calibrator devices 60 are adjusted so as to give identical responses when positioned around the same well logging instrument by adjustment of the cadmium strips 67 therein. In this connection it will be understood that any other suitable means may be employed to render the calibrator devices 60 identical. Thus, for example, the tubular body 62 of each device may be made somewhat oversized and the bodies 62 may then be turned down on a lathe by the desired amount so that they all give identical responses with a particular logging unit 20.

After the calibrator devices 60 have all been adjusted to provide uniform responses, they are then employed to calibrate a number of well logging units 20 so that all of the well logging units provide identical responses. To accomplish this, an adjustable control is provided, preferably in the surface equipment of the well logging system, which may be varried while the subsurface unit 20 is positioned within a calibrator device 60 so that the response of the well logging system can be calibrated to one of the standard calibrator devices 60. By calibrating the system at the output end thereof, i. e., in the surface equipment, compensation is provided for all of the variable parameters of the system including the strength of the neutron source, the distance thereof from the neutron detector, the efficiency of the neutron detector and the efficiency of the amplifiers in both the subsurface and surface units.

More particularly, in the simultaneous well logging system shown in Fig. 1, a variable control is provided in the neutron pulse detector circuit 37 to provide for neutron calibration. Thus, referring to Fig. 13, the neutron pulses which are transmitted over the cable 22 to the earth's surface from the subsurface unit 20 are coupled through the high pass filter indicated generally at 80 and through the coupling transformer 81 to an amplifier and A. V. C. circuit 82 wherein they are amplified and separated from the gamma ray pulses which are of the opposite phase from the neutron pulses. The neutron pulses from the circuit 82 are then employed to trigger a univibrator 83 so as to produce neutron pulses of uniform amplitude and duration which are then amplified in the amplifier 84 and are impressed upon the converter 85. In the converter 85 the univibrator pulses are impressed across a series circuit consisting of the condenser 86 and the resistor 87 and a shunt rectifier circuit including the rectifier tube 88, the potentiometer 89 and the resistors 90 and 91 is connected across the resistor 87, a rectifier load condenser 92 being connected from the cathode of the tube 88 to ground. The rectifier output voltage developed at the arm of the potentiometer 89 is then connected through a multisection, multistep low pass filter indicated generally at 95 to the control grid of a cathode follower output tube 96 in the cathode of which there is provided a meter 97 which indicates the average value of the unidirectional potential which is developed in the circuit 37 in accordance with the rate of occurrence of the neutron pulses. The voltage developed across the potentiometer 98 in the cathode circuit of the tube 96 is also impressed by way of the terminals 99 and 100 on the recorder 39 so as to provide a permanent record of the neutron response. In this connection it will be understood that reference may be had to my copending application Serial No. 205,616, referred to above for a detailed description of the circuit elements 82, 83, 84, 85, 95 and 96.

Figure 13:
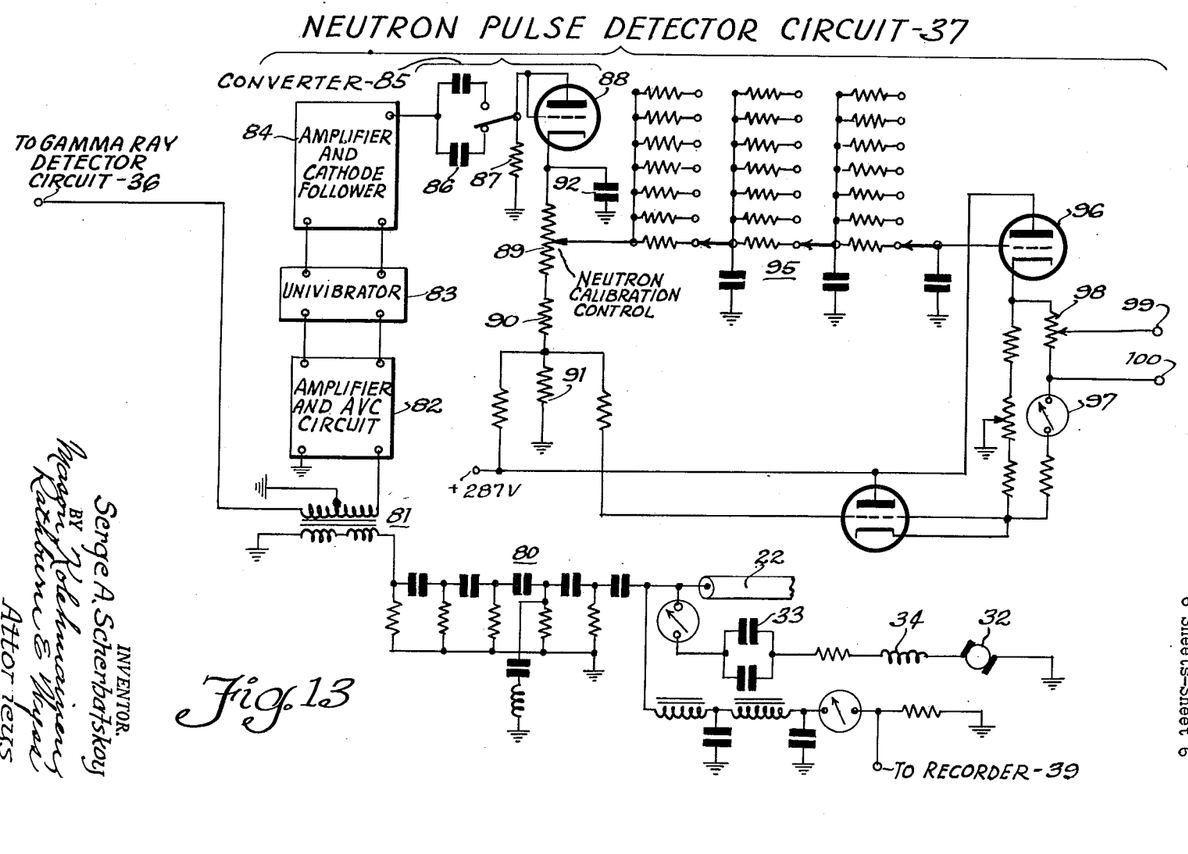
Fig. 13 is a schematic diagram of a portion of the surface equipment shown in Fig. 1.

The shaft of the potentiometer 89 is brought out to the front panel of the surface equipment unit so that this potentiometer may be adjusted in the field to vary the response of the well logging unit in accordance with the above described neutron calibration technique. Thus, with one of the calibrator devices 60 positioned around the subsurface unit 20, the potentiometer 89 is adjusted so that the meter 97 has a standard reading. This standard reading may be any arbitrary value, but is preferably the average of the readings obtained with a large number of units so as to represent the approximate mid-point in the range of responses which are obtained with a large group of units. Furthermore, the well logging unit may be kept in calibration from day to day by positioning the subsurface unit 20 within one of the calibrator devices 60 and checking the meter 97 to see whether or not a standard reading is obtained. Preferably, such calibration procedure is followed before each survey of a borehole is made. In this connection it will be understood that the neutron source 31 becomes somewhat more intense during the first few months of its life and thereafter decays at a much slower rate. Accordingly, the sensitivity of the well logging unit may vary considerably as the neutron source 31 ages. Also, the neutron detector 27 as well as the other system components may vary in sensitivity with age and operating conditions so that it may be necessary to adjust the potentiometer 89 from day to day to maintain the instrument uniform.

When the well logging system has been calibrated in the manner described above, the subsurface unit 20 may then be lowered into the borehole and by comparing and correlating the neutron and gamma ray logs obtained during the traverse from the bottom to the top of the borehole the location of limestone layers may be accurately determined in conjunction with the depth measurement obtained by the collar finder log. However, it is also desirable to determine the percent porosity of the limestone layer once it has been located so that an indication of the fluid bearing nature of the limestone layer is obtained. In order to interpret the neutron log to determine the percent porosity of the limestone, a series of tests may first be run on a group of artificial well sections with a well logging system which has been calibrated in the manner described above, and a family of curves of percent porosity versus counts per second may be plotted so that the neutron log which is obtained in the borehole may then be compared to the corresponding porosity curve to determine the percent porosity of the located limestone layer by reference to the response in counts per second obtained within this layer.

Figures 3, 4, 5, 6:
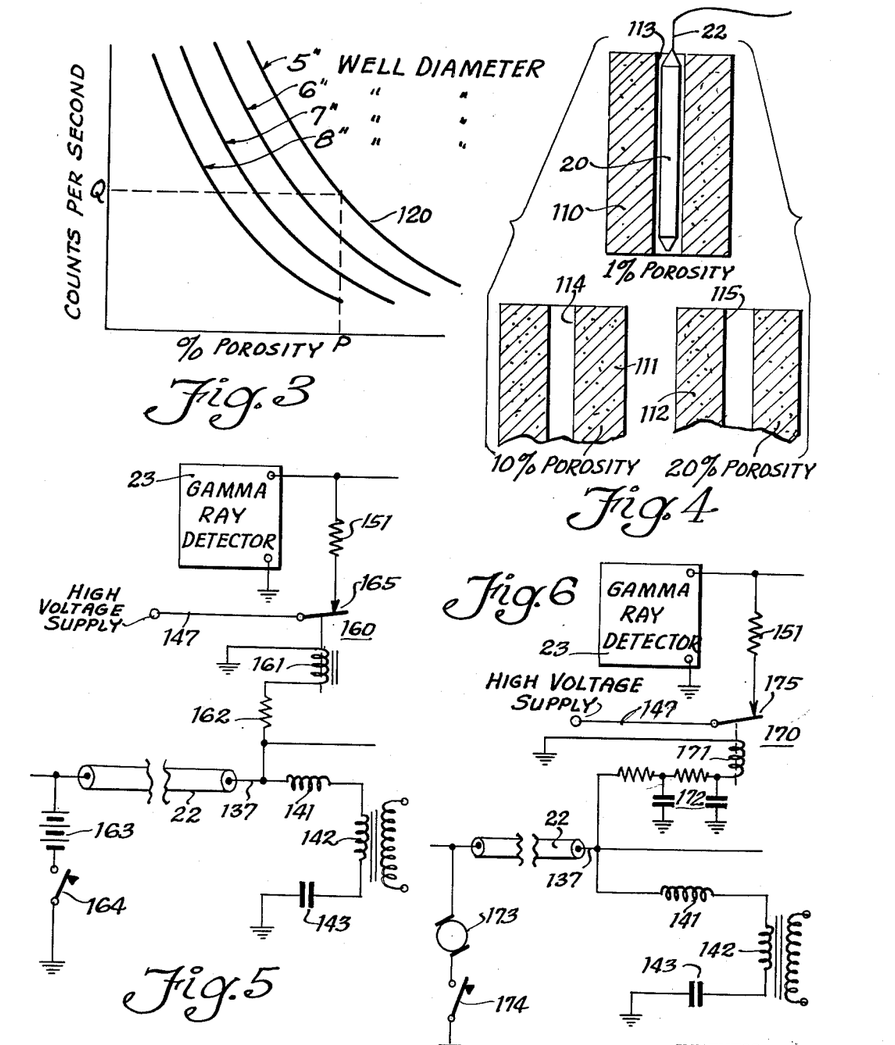
Fig. 3 is a graph of a typical family of calibration curves obtained in accordance with the present invention.
Fig. 4 shows a series of artificial well sections which may be used in the calibration system of the present invention.
Fig. 5 is a somewhat diagrammatic illustration of an alternative arrangement for deenergizing the gamma ray portion of the subsurface unit.
Fig. 6 is a somewhat diagrammatic illustration of a further arrangement for deenergizing the gamma ray portion of the subsurface unit.

More particularly, a series of artificial well sections 110, 111 and 112 (Fig. 4) may be employed which are of limestone and are provided with suitable bores 113, 114 and 115, respectively adapted to receive the subsurface unit 20 so that the unit 20 is substantially completely enclosed within the well section. The well sections 110, 111 and 112 are of different porosities, the well section 110 being indicated as having 1% porosity, the well section 111 having 10% porosity and the well section 112 having 20% porosity. Also, the bores 113, 114 and 115 of the well sections are all of the same diameter and are of a diameter corresponding to the borehole which is to be logged. Since the diameter of the borehole may vary considerably, several groups of artificial well sections, with different bore diameters are provided so that a family of curves of porosity versus counts per second can be obtained. More particularly, assuming that the bores 113, 114 and 115 are 5 inches in diameter, the subsurface unit 20 is positioned within the bore 113 of the section 110 and the counts per second obtained with a calibrated well logging system is recorded. The unit 20 is then positioned within the well section 111 and the counts per second noted after which the unit 20 is positioned within the well section 112 and the response is again noted. The unit 20 is then positioned within a similar group of well sections of larger diameter and the responses noted so that a family of curves such as shown in Fig. 3 may then be plotted in percent porosity against counts per second. In this connection it will be understood that a larger number of well sections of different porosities may be employed if it is desired to determine the porosity curves shown in Fig. 3 with greater accuracy. However, three or four points on the curve is sufficient to determine the curve satisfactorily.

After the porosity curves have been determined by means of the above described artificial well sections, the subsurface unit 20 is then lowered into the borehole and neutron and gamma ray logs are obtained in the manner described above. When a limestone layer is located by comparison of the neutron and gamma ray logs, the neutron response obtained within this layer in counts per second may then be employed to determine the porosity of this layer by employing the porosity curves of Fig. 3. Thus, if a count of Q counts per second is obtained within the layer with a five inch diameter borehole, by referring to the porosity curve 120 of Fig. 3 it may be determined that the limestone layer has a percent porosity of P. It will be noted that as the response in counts per second increases the porosity decreases, since the less porous limestone contains less hydrogenous liquid.

In the event that the porosity as a function of depth is known, as for example when the well has been previously cored and the core has been examined to determine the porosity thereof, the above described artificial well sections are not required since the same information may be obtained by running an actual log within the well. Thus, if the calibrated subsurface unit 20 is lowered within a previously cored borehole, and the neutron curve is obtained, the neutron response in counts per second as a function of porosity may be determined directly by comparing the neutron log with the porosity of the core at the same depth. With this information other wells in the same area and having the same general type of limestone may then be interpreted using the information obtained from the cored well. Thus, if a limestone layer is located in a new well and a response of 300 counts per second is obtained, by referring to the cored well information it can be determined that a response of 300 counts per second indicates a porosity of 10%, thereby determining that the located layer in the new well is a 10% porosity limestone layer.

While the foregoing neutron calibration method and apparatus is suitable for calibrating well logging instruments which relate solely to neutron logs, in a simultaneous system such as that shown in Fig. 1, wherein a natural gamma ray log is simultaneously obtained with the neutron log and both the gamma ray pulses and neutron pulses are transmitted over the same single conductor cable to the earth's surface, the gamma ray portion of the equipment may interfere with calibration of the neutron logging apparatus. This will be readily apparent when it is realized that the neutron source 31 also emits a large number of gamma rays and when the subsurface unit is calibrated at the earth's surface the gamma rays emitted by the neutron source 31 are not attenuated by the drilling mud so that a large number of gamma rays are impressed upon the natural gamma ray detector 23 of the subsurface unit 20. Accordingly, overloading of the gamma ray portion of the instrument may occur with the result that interference or crossfeed into the neutron channel is produced which interferes with calibration of the neutron portion of the equipment. In accordance with another feature of the present invention there is provided means for disabling the gamma ray detector 23 during periods when neutron calibration is performed. Since the subsurface unit 20 is conventionally eight or nine feet in length it is usually calibrated while lying horizontally and, in the embodiment shown in Figs. 2A and 2B a gravity operated switch arrangement is provided so that when the subsurface unit 20 is positioned horizontally for neutron calibration the gamma ray detector 23 is deenergized and the neutron portion of the instrument may be calibrated without interference from the gamma ray channel.

Figure 2A:
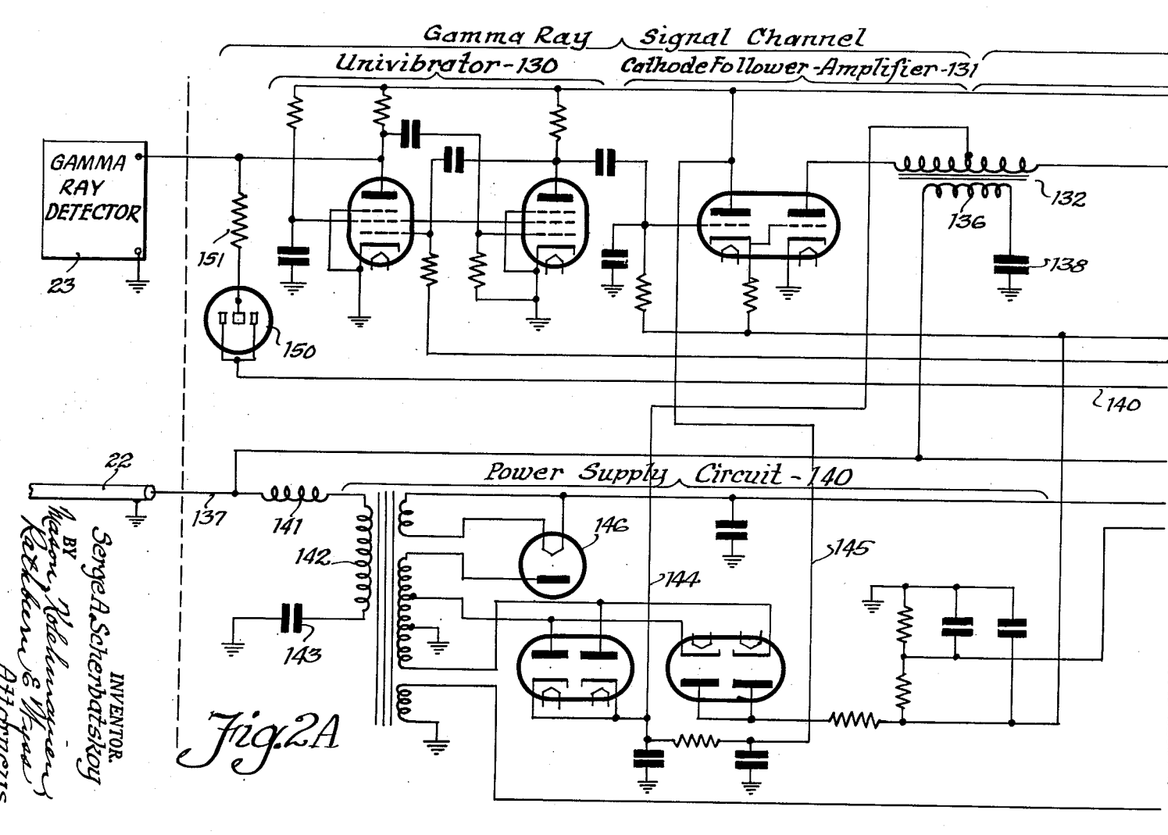
Figs. 2A and 2B schematically illustrate the subsurface equipment of the logging apparatus of Fig. 1.
Figure 2B:
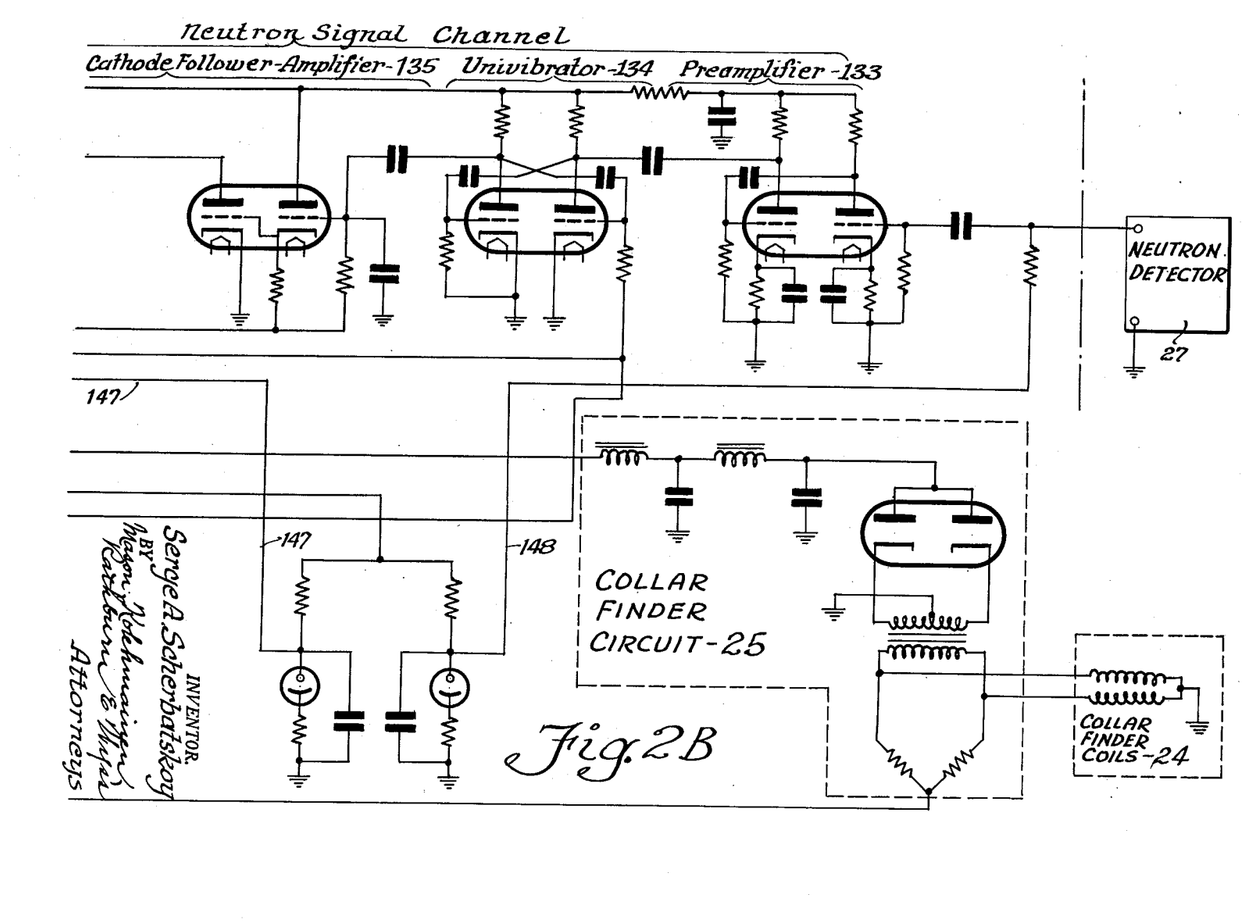

More particularly, referring to Figs. 2A and 2B, the gamma ray detector 23 is coupled to a univibrator 130 which produces pulses of uniform amplitude and duration in response to each discharge pulse of the detector 23 and the univibrator pulses are coupled through a cathode follower-amplifier 131 to the output transformer 132. The neutron detector 27 is coupled through the preamplifier 133 to the univibrator 134 which responds only to the larger pulses due to neutrons and is relatively insensitive to the small pulses produced by gamma rays, the univibrator 134 developing pulses of uniform amplitude and duration for each neutron discharge pulse developed by the detector 27. The univibrator pulses from the univibrator 134 are coupled through the cathode follower-amplifier 135 to the output transformer 132. The secondary winding 136 of the output transformer 132 is connected to the center conductor 137 of the cable 22 and is isolated from ground by means of the condenser 138. The 400 cycle power from the generator 32 is supplied over the cable 22 to the power supply circuit 140 through the choke coil 141, the power transformer 142 of the circuit 140 being isolated from ground by means of the condenser 143. The power supply circuit 140 develops suitable B+ voltages on the conductors 144 and 145 to energize the vacuum tube circuits of the subsurface unit 20 and a half-wave rectifier 146 is provided to develop relatively high voltages on the conductors 147 and 148 for the gamma ray and neutron detectors 23 and 27, respectively.

In order to deenergize the gamma ray detector 23 when the subsurface unit is laid on its side, a gravity operated mercury switch, indicated generally at 150 is connected in series with the load resistor 151 of the gamma ray detector 23 to the high voltage conductor 147. The gravity operated switch 150 is shown in more detail in Figs. 8 to 10, inclusive, and, referring to these figures, it will be seen that the switch comprises an evacuated cylindrical envelope 151a, of suitable insulating material such as glass, which is provided with a central, outwardly extending flange portion 152 of annular configuration. A pair of rod-like conductors 153 and 154 are suitably anchored in the end walls of the envelope 151a and a small body of mercury 155 is positioned within the envelope 151a.

When the subsurface unit 20 is positioned vertically in the borehole the mercury switch 150 occupies the position shown in Fig. 10 in which position the mercury falls to one end of the envelope 151a so that the conductors 153 and 154 are connected together. It will also be noted that when the subsurface unit 120 is reversed so that the other end thereof is positioned toward the bottom of the borehole, the mercury 155 falls to the other end of the envelope 151a so that the conductors 153 and 154 are again connected together. However, when the subsurface unit 20 is laid on its side, the mercury switch 150 occupies the position shown in Figs. 8 and 9 in which position the mercury 155 falls into the annular flange portion 152 of the envelope 151a with the result that the conductors 153 and 154 are not connected together. Furthermore, it will be noted that when the unit 20 is positioned horizontally the conductors 153 and 154 are not connected together for any angular position of the unit 10 since the mercury 155 merely runs within the flange 152 as the unit 20 is rotated about a horizontal axis.

From the foregoing description of the switch 150, it will be evident that the B+ supply for the gamma ray detector 23 is disconnected whenever the subsurface unit 20 is positioned horizontally and irrespective of the angular position of the unit 20 about a horizontal axis. Accordingly, when the above described neutron calibration is carried out, the gamma ray detector 23 is incapable of producing pulses in response to the relatively strong gamma radiation to which it is subjected during neutron calibration so that crossfeed from the gamma ray channel to the neutron channel is positively avoided. In this connection it will be understood that the switch 150 may be employed to deenergize the gamma ray detector 23 by means of any desired switching arrangement, as will be readily apparent to those skilled in the art.

The gamma ray detector 23 may also be deenergized during periods when the neutron channel is to be calibrated by means of the circuit arrangement shown in Fig. 5 wherein the elements which correspond to those shown in the subsurface unit of Figs. 2A and 2B have been given corresponding reference numerals. Thus, referring to Fig. 5, in the subsurface unit 20 a D. C. relay, indicated generally at 160, which is preferably of the polarized type, is employed to control the application of high voltage from the conductor 147 to the gamma ray detector 23. More particularly, the coil 161 of the relay 160 is connected to the center conductor 137 of the cable 22 through the current limiting resistor 162, the other end of the coil 161 being connected to ground. At the earth's surface a suitable unidirectional potential source, such as the illustrated battery 163, may be connected to the center conductor of the cable 22 by closing the switch 164 so that the relay 160 is energized and the normally closed contacts 165 thereof are opened. When the contacts 165 are opened high voltage is removed from the detector 23. Since the D. C. relay 160 is relatively insensitive to alternating current this relay will not be energized by the 400 cycle power supply signal which is transmitted over the cable 22 to energize the power supply circuit 140. Accordingly, the relay contacts 165 remain closed and high voltage is supplied to the detector 23 through the load resistor 151 except during periods when the switch 164 is closed for neutron calibration purposes.

The gamma ray detector 23 may also be deenergized by the alternative circuit arrangement shown in Fig. 6, wherein corresponding elements have been given the same reference numerals. In this embodiment, an A. C. relay indicated generally at 170 is provided, the coil 171 of which is connected through the low pass filter 172 to the center conductor 137 of the cable 22. At the earth's surface an alternating current generator 173 is adapted to be connected to the center conductor of the cable 22 through the switch 174. Preferably the generator 173 is of a different frequency from the generator 32, the generator 173 preferably being a 60 cycle alternating current source. When the switch 174 is closed the 60 cycle wave impressed upon the cable 22 is transmitted through the low pass filter 172 to the coil 171 of the relay 170 so that the normally closed contacts 175 thereof are opened with the result that the gamma ray detector 23 is deenergized. However, when the switch 174 is open, the 400 cycle power supplied to the transformer 142 does not pass through the low pass filter 172 so that the relay 170 is deenergized and the contacts 175 thereof remain closed so that the gamma ray detector 23 is fully operative to respond to gamma rays in the manner described above.

In an alternative embodiment shown in Fig. 7, the gamma ray detector 23 is deenergized by raising the cathode potential thereof so that insufficient voltage is impressed across the detector to support ionization. More particularly, the cathode 180 of the gamma ray detector 23 is connected through the resistor 181 to the center conductor 137 of the cable 22, a condenser 182 being connected from the cathode 180 to ground. At the earth's surface, a unidirectional potential source, such as the illustrated battery 183, is adapted to be connected to the center conductor of the cable 22 through the switch 184. When the switch 184 is closed a potential in the order of 150 volts positive is applied to the center conductor of the cable 22 and is impressed upon the cathode 180 of the detector 23 through the resistor 181. As a result, the net anode-cathode voltage across the detector 23 is reduced below the operating threshold so that the detector is prevented from ionizing in response to gamma rays. Accordingly, no gamma ray pulses are produced across the load resistor 151 of the detector and the neutron calibration operation may be carried out in the manner described above without interference from the gamma ray channel. However, the alternating current signals normally present on the conductor 137 are not impressed upon the cathode 180 of the detector 23 due to the filtering action of the series resistor 181 and the large by-pass condenser 182.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In a penetrative radiation well logging system of the type comprising a subsurface exploration unit provided with a source of neutrons and a detector of radiations due to neutron bombardment of the formations and including facilities for logging the radiation response of said detector within a borehole, means for calibrating said system to a fixed standard including a portable calibrator device adapted to be positioned adjacent said subsurface unit and provide a predetermined interaction with the neutrons emitted by said source, and means for adjusting the radiation response of said system to a standard output value when said calibrator device is positioned adjacent said subsurface unit.

2. A calibration system as claimed in claim 1 wherein said calibrator device includes a tubular body of paper base phenolic resin adapted to enclose said subsurface unit.

3. A calibrating device for calibrating at the site of a well to be logged a penetrative radiation well logging system of the type comprising a cylindrical subsurface unit adapted to be lowered into a borehole and provided with a source of neutrons and a detector of radiation due to neutron bombardment of the formations and including surface equipment for logging the radiation response of said detector within the borehole, comprising a portable body of neutron interactive material having a bore extending therethrough, and means for positioning said subsurface unit within said bore in predetermined interfitting relation therewith.

4. A calibrating device for calibrating at the site of a well to be logged a penetrative radiation well logging system of the type comprising a cylindrical subsurface unit adapted to be lowered into a borehole and provided with a source of neutrons and a detector of radiations due to neutron bombardment of the formations and including surface equipment for logging the radiation response of said detector within the borehole, comprising a portable elongated tubular body of material containing a substantial proportion of an element having an atomic number not greater than twenty, and means for positioning said subsurface unit within said body in predetermined interfitting relation therewith.

5. A calibrating device for calibrating a penetrative radiation well logging system of the type comprising a cylindrical subsurface unit adapted to be lowered into a borehole and provided with a source of neutrons and a detector of radiations due to neutron bombardment of the formations and including surface equipment for logging the neutron response of said detector within the borehole, comprising an elongated hollow body of neutron interactive material, means for positioning said subsurface unit within said body in predetermined interfitting relation therewith, and means for varying the amount of neutron interaction with said source.

6. A calibrating device for calibrating a penetrative radiation well logging system of the type comprising a cylindrical subsurface unit adapted to be lowered into a borehole and provided with a source of neutrons and a neutron detector and including surface equipment for logging the neutron response of said detector within the borehole, comprising an elongated tubular body of neutron interactive material, means for positioning said subsurface unit within said body in substantially concentric relation therewith, and means for varying the amount of neutron interaction produced by said body, said last named means comprising a strip of neutron attenuating material supported on the inner wall of said tubular body, and means for varying the position of said strip with respect to the inner wall of said tubular body.

7. In a simultaneous penetrative radiation well logging system of the type including a subsurface unit adapted to be lowered into a borehole by means of a cable and having a neutron portion including a source of neutrons and a detector of radiations due to neutron bombardment of the formations and a natural gamma ray portion including a natural gamma ray detector therein, the outputs of both said detectors being transmitted over said cable to the earth's surface and including facilities for logging the response of said detectors within the borehole, means for calibrating the neutron portion of said well logging system when said unit is outside the borehole, comprising means for positioning said unit adjacent a portable calibrating device adapted to provide a predetermined interaction with the neutrons emitted by said source, means for deenergizing said natural gamma ray portion of said system to prevent the same from interfering with calibration of the neutron portion of said system, and means for adjusting the response of the neutron portion of said system to a standard output value when said calibrator device is positioned adjacent said subsurface unit.

8. In a simultaneous penetrative radiation well logging system of the type including a subsurface unit adapted to be lowered into a borehole by means of a cable and having a source of neutrons, a detector of radiations due to neutron bombardment of the formations and a gamma ray detector therein, the outputs of both said detectors being transmitted over said cable to the earth's surface and including facilities for logging the response of said detectors within the borehole, means for calibrating the radiation detector portion of said system when said unit is outside the borehole, comprising a calibrating device adapted to surround said subsurface unit and provide a predetermined interaction with neutrons emitted by said neutron source, means for preventing the gamma ray detector portion of said system from responding to gamma rays emitted by said source, and means for adjusting the response of the radiation detector portion of said system to a standard output value.

9. In a simultaneous penetrative radiation well logging system of the type including a subsurface unit adapted to be lowered into a borehole by means of a cable and having a source of neutrons, a detector of radiations due to neutron bombardment of the formations and a gamma ray detector therein, the outputs of both said detectors being transmitted over said cable to the earth's surface and including facilities for logging the response of said detectors within the borehole, means for calibrating the radiation detector portion of said system when said unit it outside the borehole, comprising a calibrating device adapted to surround said subsurface unit and provide a predetermined interaction with neutrons emitted by said neutron source, means responsive to positioning of said unit with the axis thereof horizontal for disabling the gamma ray detector portion of said system, and means for adjusting the response of the radiation detector portion of said system to a standard output value.

10. In a simultaneous penetrative radiation well logging system of the type including a subsurface unit adapted to be lowered into a borehole by means of a cable and having a source of neutrons, a detector of radiations due to neutron bombardment of the formations and a gamma ray detector therein, the outputs of both said detectors being transmitted over said cable to the earth's surface and including facilities for logging the response of said detectors within the borehole, means for calibrating the radiation detector portion of said system when said unit is outside the borehole, comprising a calibrating device adapted to surround said subsurface unit and provide a predetermined interaction with neutrons emitted by said neutron source, means for reducing the potential applied to said gamma ray detector below the operating threshold thereof, thereby to prevent said gamma ray detector from responding to gamma rays emitted by said neutron source, and means for adjusting the response of the radiation detector portion of said system to a standard output value.

11. In a simultaneous penetrative radiation well logging system of the type including a subsurface unit adapted to be lowered into a borehole by means of a cable and having a source of neutrons, a detector of radiations due to neutron bombardment of the formations and a gamma ray detector therein, the outputs of both said detectors being transmitted over said cable to the earth's surface and including facilities for logging the response of said detectors within the borehole, means for calibrating the radiation detector portion of said system when said unit is outside the borehole, comprising a calibrating device adapted to surround said subsurface unit and provide a predetermined interaction with neutrons emitted by said neutron source, means including a gravity operated switch for deenergizing said gamma ray detector when said unit is positioned with the longitudinal axis thereof horizontal, said switch means comprising a cylindrical envelope of insulating material positioned within said subsurface unit with the longitudinal axis thereof parallel to the longitudinal axis of said unit and having an outwardly extending annular trough in the sidewall thereof, a pair of rod-like electrodes in said envelope extending generally parallel to the axis thereof and connected in circuit with said gamma ray detector, and a body of fluid electrically conductive material in said envelope for connecting said electrodes together when said unit is positioned vertically with either end thereof in the downward direction, said body of conductive material flowing into said trough when said unit is positioned horizontally so that said electrodes are electrically disconnected for all angular positions of said unit when said unit is horizontal, and means for adjusting the response of the radiation detector portion of said system to a standard output value.

12. In a simultaneous penetrative radiation well logging system of the type including a subsurface unit adapted to be lowered into a borehole by means of a cable and having a source of neutrons, a detector of radiations due to neutron bombardment of the formations and a gamma ray detector therein, the outputs of both said detectors being transmitted over said cable to the earth's surface and including facilities for logging the response of said detectors within the borehole, means for calibrating the radiation detector portion of said system when said unit is outside the borehole, comprising a calibrating device adpated to surround said subsurface unit and provide a predetermined interaction with neutrons emitted by said neutron source, means including a gravity operated switch for deenergizing said gamma ray detector when said unit is positioned with the longitudinal axis thereof horizontal, said switch means comprising a cylindrical envelope of insulating material positioned within said subsurface unit with the longitudinal axis thereof parallel to the longitudinal axis of said unit and having an outwardly extending annular trough in the sidewall thereof, a pair of rod-like electrodes in said envelope extending generally parallel to the axis thereof and connected in circuit with said gamma ray detector, and a body of fluid electrically conductive material in said envelope for connecting said electrodes together when said unit is positioned vertically, said body of conductive material flowing into said trough when said unit is positioned horizontally so that said electrodes are electrically disconnected for all angular positions of said unit when said unit is horizontal, and means for adjusting the response of the radiation detector portion of said system to a standard output value.

13. A calibration system as claimed in claim 1 wherein said portable calibrator device comprises an elongated hollow body of material containing a substantial proportion of an element having an atomic number not greater than twenty, said body being adapted to enclose at least a portion of said subsurface unit.

14. A calibration system as claimed in claim 1 wherein said portable calibrator device comprises an elongated hollow body of hydrogenous material adapted to enclose at least a portion of said subsurface unit.

15. A calibration system as claimed in claim 1 wherein said portable calibrator device comprises an elongated hollow body of carbonaceous material adapted to enclose at least a portion of said subsurface unit.

16. A calibration system as claimed in claim 1 wherein said portable calibrator device comprises an elongated hollow body of resinous material adapted to enclose at least a portion of said subsurface unit.

17. A calibration system as claimed in claim 1 wherein said portable calibrator device comprises a tubular body of synthetic resin adapted to enclose at least a portion of said subsurface unit.

18. A calibration system as claimed in claim 1 wherein said portable calibrator device comprises a tubular container filled with hydrogenous material and adapted to enclose at least a portion of said subsurface unit.

19. A calibration system as claimed in claim 1 wherein said portable calibrator device comprises a tubular body of plastic adapted to enclose at least a portion of said subsurface unit.

20. A calibrating device as claimed in claim 3 wherein said body is spaced from the periphery of said cylindrical subsurface unit by a substantial amount when in concentric relation therewith.

21. A calibrating device as claimed in claim 4 wherein said body is spaced a substantial distance from the periphery of said cylindrical subsurface unit when in concentric relation therewith.

22. A calibrating device for calibrating at the site of a well to be logged a penetrative radiation well logging system of the type comprising a cylindrical subsurface unit adapted to be lowered into a borehole and provided with a source of neutrons and a detector of radiations due to neutron bombardment of the formations and including surface equipment for logging the radiation response of said detector within the borehole, comprising a hollow elongated body of neutron interactive material, means for positioning at least a portion of said subsurface unit within said body in predetermined interfitting relation therewith, and a member of neutron absorbing material movable to different positions with respect to said body.

23. A calibrating device for calibrating at the site of a well to be logged a penetrative radiation well logging system of the type comprising a cylindrical subsurface unit adapted to be lowered into a borehole and provided with a source of neutrons and a detector of radiations due to neutron bombardment of the formations and including surface equipment for logging the radiation response of said detector within the borehole, comprising a hollow elongated body of neutron interactive material, means for positioning at least a portion of said subsurface unit within said body in predetermined interfitting relation therewith, a body of neutron absorbing material, and means for adjustably positioning said body of neutron absorbing material relative to said body of neutron interactive material.

24. In a penetrative radiation well logging system of the type comprising a cylindrical subsurface unit adapted to be lowered into a borehole and provided with a source of neutrons and a detector of radiations due to neutron bombardment of the formations and including surface equipment for logging the radiation response of said detector within the borehole, a device for calibrating said well logging system at the site of the well to be logged and while said unit is supported in a substantially horizontal position at the earth's surface, comprising an elongated hollow body of neutron interactive material, and means for positioning at least a portion of said subsurface unit within said body in predetermined interfitting relation therewith.

25. In a penetrative radiation well logging system of the type comprising a cylindrical subsurface unit adapted to be lowered into a borehole and provided with a source of neutrons and a detector of radiations due to neutron bombardment of the formations and including surface equipment for logging the radiation response of said detector within the borehole, a device for calibrating said well logging system at the site of the well to be logged and while said unit is supported in a substantially horizontal position at the earth's surface, comprising an elongated hollow body of neutron interactive material, and means for supporting said cylindrical subsurface unit with the longitudinal axis thereof in a substantially horizontal plane and with at least a portion of said subsurface unit positioned within said body in predetermined interfitting relation therewith.

References Cited in the file of this patent

UNITED STATES PATENTS

| | | |
|---|---|---|
| 2,290,869 | Fingold | July 28, 1942 |
| 2,436,008 | Krasnow et al. | Feb. 17, 1948 |
| 2,505,919 | Simpson | May 2, 1950 |
| 2,506,149 | Herzog | May 2, 1950 |
| 2,508,986 | Anderson | May 23, 1950 |
| 2,641,669 | Glickman | June 9, 1953 |
| 2,659,014 | Scherbatskoy | Nov. 10, 1953 |
| 2,666,857 | McLaren et al. | Jan. 19, 1954 |